United States Patent
Bidkar et al.

(10) Patent No.: US 12,530,232 B2
(45) Date of Patent: Jan. 20, 2026

(54) COGNITIVE CONVERGENCE ENGINE FOR RESOURCE OPTIMIZATION

(71) Applicant: Bank of America Corporation, Charlotte, NC (US)

(72) Inventors: Prashant Anna Bidkar, Delhi (IN); Hitesh Chopra, Gurugram (IN); Anjani Mishra, New Delhi (IN); Avinash Kumar Gupta, Telangana (IN); Prashant Khare, Maharashtra (IN); Sarvesh Subramani, Telangana (IN)

(73) Assignee: Bank of America Corporation, Charlotte, NC (US)

(*) Notice: Subject to any disclaimer, the term of this patent is extended or adjusted under 35 U.S.C. 154(b) by 818 days.

(21) Appl. No.: 17/496,994

(22) Filed: Oct. 8, 2021

(65) Prior Publication Data

US 2023/0116263 A1 Apr. 13, 2023

(51) Int. Cl.
*G06F 9/50* (2006.01)

(52) U.S. Cl.
CPC .................. *G06F 9/5027* (2013.01)

(58) Field of Classification Search
CPC ...... G06F 9/5005; G06F 9/5027; G06Q 10/06
See application file for complete search history.

(56) References Cited

U.S. PATENT DOCUMENTS

| | | | |
|---|---|---|---|
| 7,634,430 B2 | 12/2009 | Huberman et al. | |
| 8,881,142 B1* | 11/2014 | Reid | G06F 9/485 718/1 |
| 8,954,981 B2 | 2/2015 | Harris et al. | |
| 9,384,059 B2 | 7/2016 | Yamamoto et al. | |
| 9,477,527 B2 | 10/2016 | Wu et al. | |
| 9,846,599 B1* | 12/2017 | Baranczyk | G06F 11/30 |
| 10,055,239 B2 | 8/2018 | Adogla et al. | |
| 10,657,061 B1* | 5/2020 | Marriner | H04L 41/0893 |
| 10,838,772 B2 | 11/2020 | Kelly et al. | |
| 2004/0055002 A1* | 3/2004 | Das | G06F 9/5055 709/227 |
| 2009/0157742 A1* | 6/2009 | Anderson | G06F 9/5016 |
| 2009/0183186 A1* | 7/2009 | Murtagh | G06F 9/451 719/329 |

(Continued)

*Primary Examiner* — Lewis A Bullock, Jr.
*Assistant Examiner* — Jordan Scott Motter
(74) *Attorney, Agent, or Firm* — Banner & Witcoff, Ltd.

(57) ABSTRACT

Arrangements for using a cognitive convergence engine for resource optimization are provided. Requests for service, such as a loan, an account, or the like, may be received via different communication channels. The requests for service may be aggregated based on type of request and transferred to a cloud environment for evaluation. A request may be evaluated to determine whether it is eligible for bot processing. If so, the request may be transferred to a bot server for processing. If not, the request may be evaluated to identify a best fit resource for processing. Identifying the best fit resource may include scores computed by a plurality of computational instances or virtual machines configured to process the computations. A number of computational instances may be determined based on a volume of requests. The computational instances may then be deployed to determine a best fit resource for the first request.

17 Claims, 10 Drawing Sheets

(56) References Cited

U.S. PATENT DOCUMENTS

| | | | |
|---|---|---|---|
| 2012/0167112 A1* | 6/2012 | Harris | G06F 9/5072 |
| | | | 718/104 |
| 2013/0019018 A1* | 1/2013 | Rice | H04L 67/51 |
| | | | 709/226 |
| 2019/0121972 A1* | 4/2019 | Norvill | G06F 21/554 |
| 2019/0182352 A1* | 6/2019 | Feijoo | H04L 67/63 |
| 2019/0286473 A1* | 9/2019 | Emma | G06F 9/466 |
| 2020/0348960 A1* | 11/2020 | Krishnamurthy | G06F 9/45529 |
| 2021/0298557 A1* | 9/2021 | Budampati | G01M 3/04 |

* cited by examiner

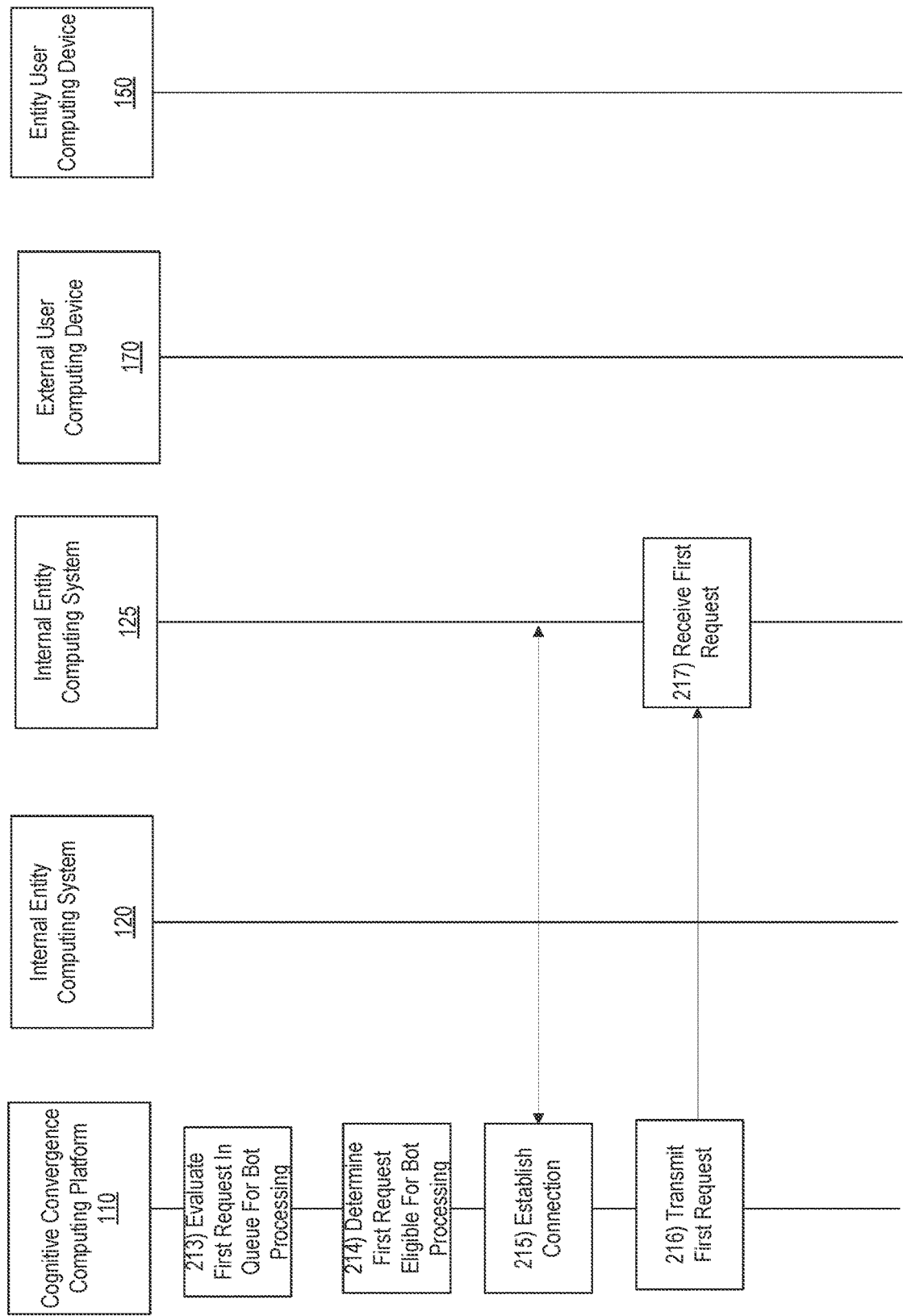

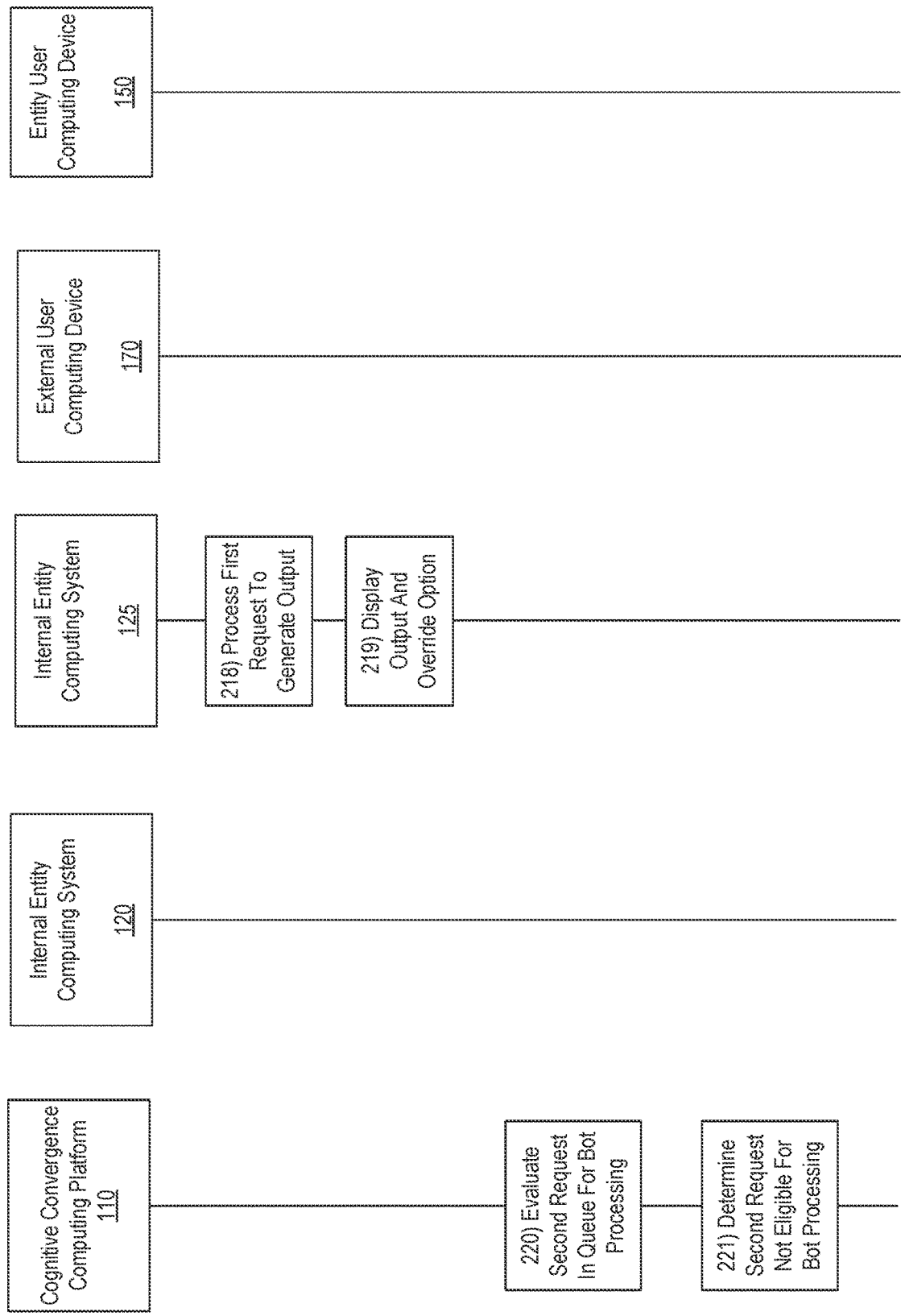

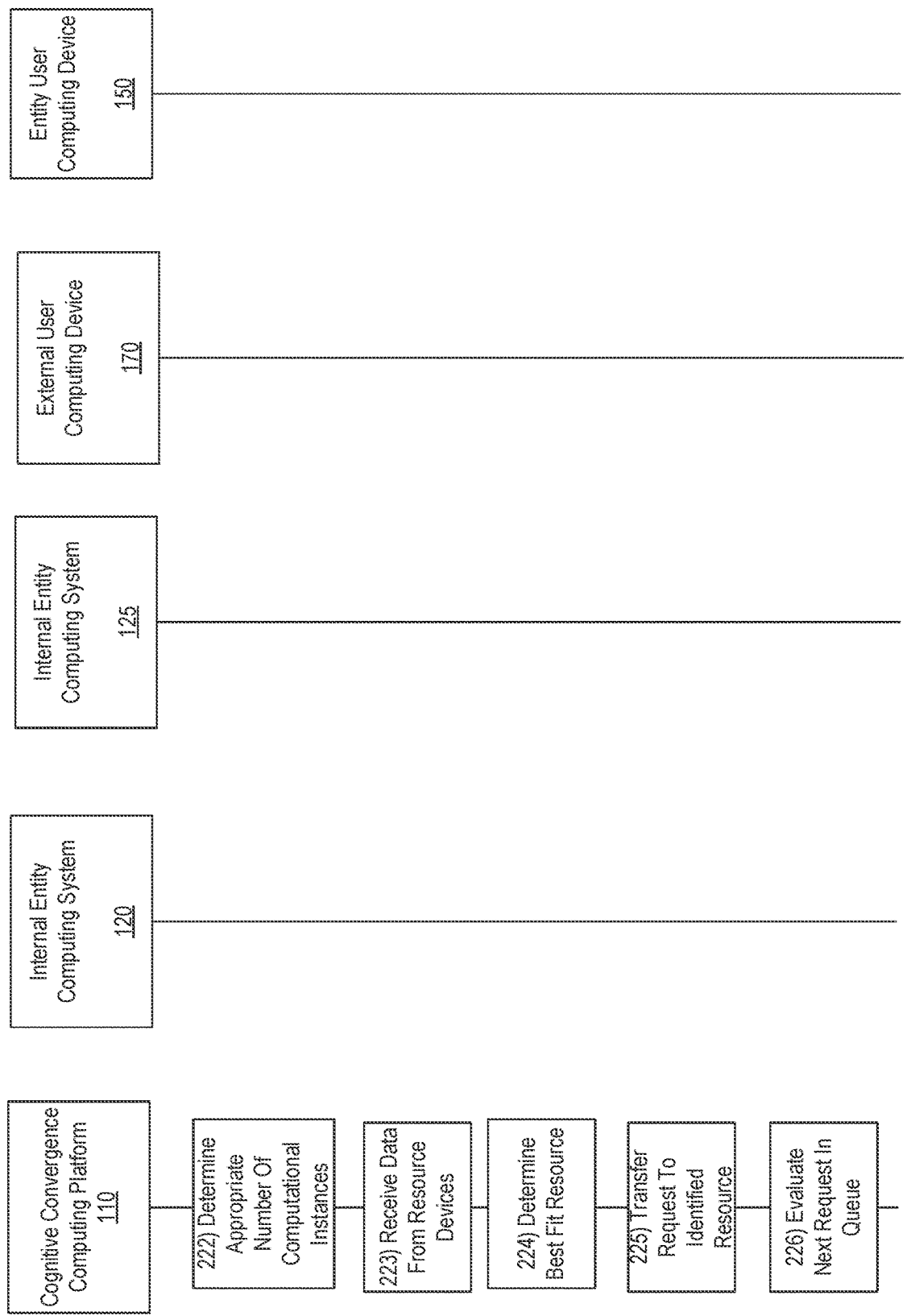

COGNITIVE CONVERGENCE ENGINE FOR RESOURCE OPTIMIZATION

BACKGROUND

Aspects of the disclosure relate to electrical computers, systems, and devices including a multi-layer, cloud-based artificial intelligence integrated architecture to compute and prepare optimal computational resources.

Enterprise organizations often have business processes operating from multiple geographical locations. These business processes may pose various challenges in prioritization and optimal distribution of service requests among available resources. In some examples, multiple channels coupled with lack of adequate information availability may result in prolonged queuing and increased administrative work. Further, the decision-making process may be highly complex and dependent on various factors, such as input channel, resource availability, proficiency level, importance flag, and the like. Accordingly, arrangements described herein are directed to a multi-layer, cloud-based artificial intelligence integrated architecture to compute and prepare optimal computational resources.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with intelligently and dynamically processing requests.

In some aspects, one or more requests for service may be received. Some example requests for service may include a loan application, such as a mortgage, auto loan, or the like, initiation of a claim, opening of an account, such as a checking account, retirement savings account, or the like. In some examples, the one or more requests may be received via one or more different communication channels. The requests for service may be aggregated based on type of request (e.g., messages may be aggregated in a messaging queue based on type of request). The aggregated requests may then be addressed from the one or more generated messaging queues.

A first request may be evaluated and a determination may be made as to whether it is eligible for bot processing. For instance, a polylithic cognitive optimizer of a computing platform may determine whether the first request is eligible for bot processing. If so, the first request may be transferred to a bot server for bot processing. If not, the first request may be evaluated to identify a best fit resource to handle the first request.

In some examples, identifying the best fit resource may be performed by computing a score associated with each resource. The scores may be computed by a plurality of computational instances or virtual machines configured to process the computations. A number of computational instances (e.g., in a region) may be determined by a computing platform (e.g., by a computing platform executing a polylithic cognitive optimizer) based on a volume of requests. In some examples, the number of computational instances may be created based on the determined number and volume. Additionally or alternatively, the number of computational instances may be modified (e.g. increased or decreased) based on the volume.

The computational instances may then be deployed to determine a best fit resource for the first request. In some examples, the best fit resource may be determined based on parameters such as errors made in processing, a predictive model output, computer adaptive testing, and the like.

Real-time availability data from a plurality of resource devices may be received and used to determine availability of the identified best fit resource. If available, the first request may be transferred to the identified best fit resource. If not available, another resource may be identified. Additional requests may then be evaluated.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing cognitive convergence functions for resource optimization in accordance with one or more aspects described herein;

DETAILED DESCRIPTION

Figure 1A:
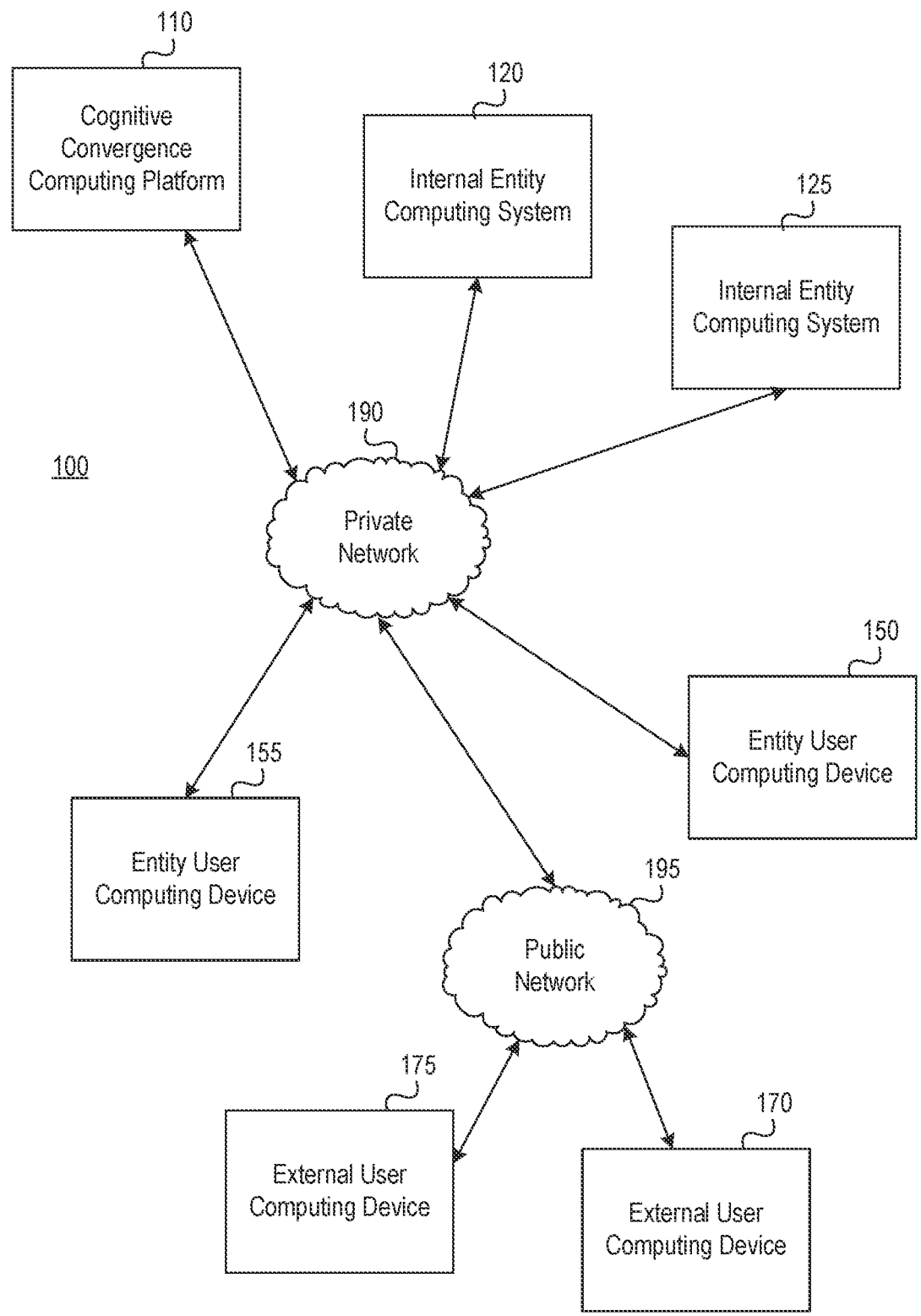
FIGS. 1A and 1B depict an illustrative computing environment for implementing cognitive convergence functions for resource optimization in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations often have different types of service or action requests being received form multiple customers by multiple sites. Given the large volume of requests and, in some cases, supporting documentation associated with the requests, it can be difficult and time consuming to identify an appropriate resource (e.g., associate or other entity user) to address various requests. Accordingly, aspects described herein rely on a multi-layer, cloud-based architecture for identifying an optimized resource to handle requests.

In some examples, requests for service or action may be received from multiple customers via multiple channels, such as via email, an online application, a mobile application, a phone call, via a service center, financial center, or the like. Requests may be received for various products or types of service or action, such as a request to open a credit card, a loan request, a customer service inquiry, or the like. In some examples, the requests may be aggregated in a messaging queue. In some arrangements, a messaging queue may be generated for each type of request. For instance, all credit card requests may be aggregated in a first messaging queue, while all loan applications may be aggregated in a second, different messaging queue.

From the messaging queue, each request may be evaluated by a cloud-based evaluation system. For instance, due to the large volume of requests, data associated with requests, and the like, cloud-based computing may be used to identify a best fit resource to handle a request. For instance, a computing platform, such as an optimization computing platform, may evaluate each request to determine whether it can be handled by a bot. If so, the request may be transferred to a bot server for processing.

If the request is not eligible for bot processing, the request may be evaluated to identify the best fit resource to handle the request. In some examples, a polylithic cognitive optimizer may determine a number of virtual machines to evaluate each request within a cloud region. For instance, based on volume of requests within a cloud region, the polylithic cognitive optimizer may determine a number of virtual machines to execute computations to identify the best fit resource and may create that number of computational instances.

The computational instances may then determine a score associated with each request that may be used to determine the best fit resource. For instance, rules hosted by a cognitive rules engine may be used to evaluate resources. In some examples, a score may be generated based on various parameters and, based on the score, the request may be assigned to a particular resource to be addressed.

In some examples, determining the best fit resource may include receiving (e.g., via an Internet of Things (IoT) hub, real-time availability data of resources based on, for instance, cursor movement, activity logs, and the like.

In some arrangements, an IoT hub may receive status information from the plurality of computational instances to identify one or more instances that are performing abnormally. If one or more instances is identified as having unexpected performance, that instance may be replaced with a new computational instance that may, in some examples, take over any processing functions being performed by the removed instance. Accordingly, issues in processing may be quickly identified and remedied to reduce or eliminate impact to processing.

These and various other arrangements will be discussed more fully below.

Figure 1B:
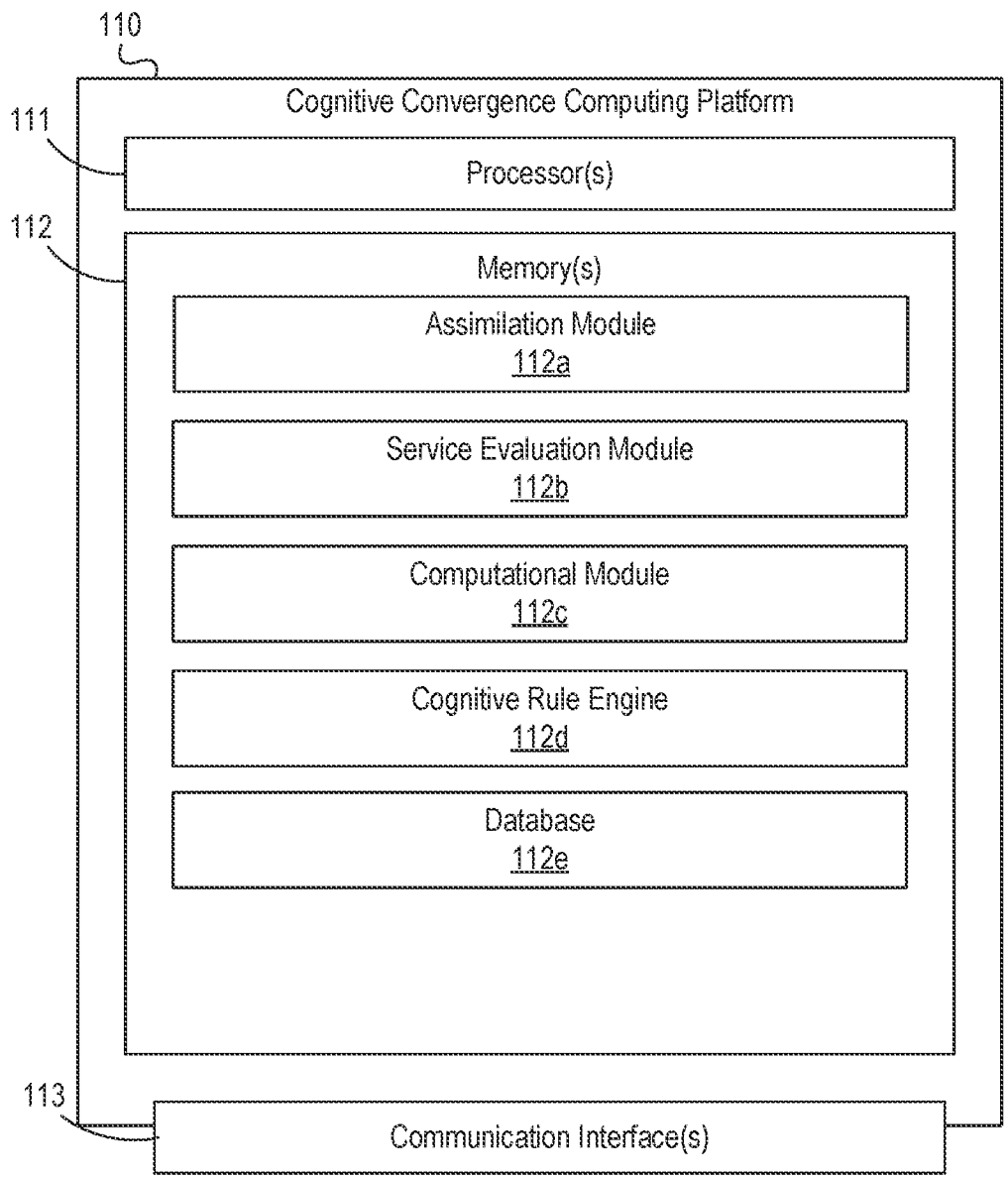

FIGS. 1A-1B depict an illustrative computing environment for implementing and using cognitive convergence functions for resource optimization in accordance with one or more aspects described herein. Referring to FIG. 1A, computing environment 100 may include one or more computing devices and/or other computing systems. For example, computing environment 100 may include cognitive convergence computing platform 110, internal entity computing system 120, internal entity computing system 125, entity user computing device 150, entity user computing device 155, external user computing device 170 and external user computing device 175. Although two internal entity computing systems 120, 125, two entity user computing devices 150, 155, and two external user computing devices 170, 175, are shown, more or fewer systems or devices may be used without departing from the invention.

Cognitive convergence computing platform 110 may be configured to provide intelligent, dynamic evaluation of requests and resource optimization. For instance, cognitive convergence computing platform 110 may include a multi-stack architecture including various modules or stacks performing various functions. For instance, requests for service or action (e.g., loan application, customer service, or the like) may be received by the cognitive convergence computing platform 110 and aggregated into one or more messaging queues. In some examples, each type of request may be aggregated into a messaging queue for that type of request. For instance, requests for a loan application may be aggregated into a first messaging queue while credit card applications or requests may be aggregated into a second, different messaging queue.

In some examples, a first request for action or service in the messaging queue may then be evaluated to determine whether it can be addressed by a bot. If so, the first request may be transferred to a bot server for processing by the bot. In some examples, scheduling a bot may be based on a type of request, type of service, or the like.

If the first request is not eligible for bot processing, it may be assigned to another resource based on a determination of a best region available to address the request, a best site to address the request and/or a best fit resource to address the request. In some examples, evaluating the resource to which the first request may be assigned may be based on a load balancing process. For instance, a polylithic cognitive optimizer may determine an appropriate number of computational instances (e.g., virtual machines) to process computations associated with identifying the best fit resource for a volume of requests in a particular region, site, or the like. In some examples, an Internet of Things (IoT) hub may monitor the instances to detect potential failures. Upon detecting a potential failure, another instance may be created or deployed, the number of instances being used may be reevaluated, and the like.

Based on the evaluation performed, the cognitive convergence computing platform 110 may employ the determined number of instances to evaluate the volume of requests to identify the best fit resource to handle the request and may assign the first request to an appropriate resource. In some examples, identifying the appropriate resource may be based on various parameters and weighting factors, and/or data from an IoT hub monitoring resource availability by, for instance, receiving data related to cursor movement of the computing devices, activity logs associated with the resource users and devices, and the like.

Internal entity computing system 120 and/or internal entity computing system 125 may be one or more computing devices, systems, or the like, associated with the entity or enterprise organization implementing the cognitive convergence computing platform 110. Internal entity computing system 120 and/or internal entity computing system 125 may have or include one or more databases, file storage systems, may host or execute one or more applications, and the like, used for execution of the business of the entity or enterprise organization. For instance, in some examples, one or more of internal entity computing system 120 and/or internal entity computing system 125 may host a customer facing portal or application, such as an online banking system, mobile application, or the like, configured to receive customer or user requests for service (e.g., from one or more user computing devices). Additionally or alternatively, one or more of internal entity computing system 120 and/or internal entity computing system 125 may be or include a bot server configured to schedule and host one or more bots configured to address requests for service.

Entity user computing device 150 and/or entity user computing device 155 may be one or more computing devices associated with the enterprise organization. For instance, entity user computing device 150 may be a computing device accessed by one or more users (e.g., employees of the enterprise organization) in the course of business and may be used to receive and address customer requests, and the like. In some examples, one or more of entity user computing device 150 and/or entity user computing device 155 may be computing devices operated by a customer service representative of the enterprise organization and configured to receive user input including requests from one or more users received via various channels (e.g., in person, over the telephone, or the like). In some examples, entity user computing device 150 and/or entity user computing device 155 may be configured to receive outputs from one or more bots, display the outputs including an override option to override the output generated by the bot, receive user input, and the like. Additionally or alternatively, entity user computing device 150 and/or entity user computing device 155 may be a resource user device (e.g., an enterprise organization user device to address the request for service) to which one or more requests for service or action may be assigned and addressed.

External user computing device 170 and/or external user computing device 175 may be a user computing device, such as a desktop computer, laptop computer, tablet, smartphone, wearable device, or the like, associated with one or more users, customers or potential customers of the enterprise organization. In some examples, users may input a request for service to external user computing device 170 and/or external user computing device 175, which may then be conveyed to the cognitive convergence computing platform 110 for evaluation and processing.

Computing environment 100 also may include one or more computing platforms. For example, and as noted above, computing environment 100 may include cognitive convergence computing platform 110. As illustrated in greater detail below, cognitive convergence computing platform 110 may include one or more computing devices configured to perform one or more of the functions described herein. For example, cognitive convergence computing platform 110 may include one or more computers (e.g., laptop computers, desktop computers, servers, server blades, or the like). In some examples, cognitive convergence computing platform 110 may be cloud-based computing platform configured to efficiently handle big data processing.

As mentioned above, computing environment 100 also may include one or more networks, which may interconnect one or more of cognitive convergence computing platform 110, internal entity computing system 120, internal entity computing system 125, entity user computing device 150, entity user computing device 155, external user computing device 170, and/or external user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cognitive convergence computing platform 110, internal entity computing system 120, internal entity computing system 125, entity user computing device 150 and entity user computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect cognitive convergence computing platform 110, internal entity computing system 120, internal entity computing system 125, entity user computing device 150, entity user computing device 155, and one or more other computing devices and/or computer systems that are used by, operated by, and/or otherwise associated with the organization. Public network 195 may connect private network 190 and/or one or more computing devices connected thereto (e.g., cognitive convergence computing platform 110, internal entity computing system 120, internal entity computing system 125, entity user computing device 150, entity user computing device 155) with one or more networks and/or computing devices that are not associated with the organization. For example, external user computing device 170, and/or external user computing device 175, might not be associated with an organization that operates private network 190 (e.g., because external user computing device 170 and/or external user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external user computing device 170 and/or external user computing device 175 to private network 190 and/or one or more computing devices connected thereto (e.g., cognitive convergence computing platform 110, internal entity computing system 120, internal entity computing system 125, entity user computing device 150, entity user computing device 155).

Referring to FIG. 1B, cognitive convergence computing platform 110 may include one or more processors 111, memory 112, and communication interface 113. A data bus may interconnect processor(s) 111, memory 112, and communication interface 113. Communication interface 113 may be a network interface configured to support communication between cognitive convergence computing platform 110 and one or more networks (e.g., private network 190, public network, or the like). Memory 112 may include one or more program modules having instructions that when executed by processor(s) 111 cause cognitive convergence computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cognitive convergence computing platform 110 and/or by different computing devices that may form and/or otherwise make up cognitive convergence computing platform 110.

For example, memory 112 may have, store and/or include assimilation module 112a. Assimilation module 112a may store instructions and/or data that may cause or enable the cognitive convergence computing platform 110 to aggregate all requests for service, action, or the like into one or more messaging queues. For instance, requests for service or action, such as a credit card application, loan application, customer service request, or the like, may be received from users in various different locations and via one or more different communication channels. For instance, an enterprise organization may have a plurality of cloud computing environments servicing various different geographic regions or locations. In some examples, requests for service or action may be received from one or more different regions or locations and may be received aggregated at a single site by the assimilation module 112a. In some arrangements, all requests received from all processing environments may be received and aggregated at a single site by assimilation module 112a.

In some examples, the assimilation module 112a may receive requests via a plurality of different communication channels. For instance, requests may be received from an online or mobile application executing on a user device, via an email request for service, via a telephone call to a call center or other customer service center, via an associated located at a financial center or other location, or the like. The requests from one or more various different channels may be aggregated into the one or more messaging queues by the assimilation modules 112a.

In some arrangements, messaging queues may be generated for each type of request. Accordingly, the assimilation module 112a may aggregated all requests of a first type in a first messaging queue, all requests of a second type in a second messaging queue, and the like.

In some examples, aggregating the data may include masking at least a portion of the data to protect personally identifying information of the user or to maintain privacy and security of the user data.

Cognitive convergence computing platform 110 may further have, store and/or include service evaluation module 112b. Service evaluation module 112b may store instructions and/or data that may cause or enable the cognitive convergence computing platform 110 to evaluate the aggregated requests to distribute to a resource configured to process the request. For instance, a first request from a first messaging queue may be evaluated by, for instance, a polylithic cognitive optimizer of the service evaluation module 112b, to determine whether the first request is eligible to be handled by a bot. If so, the service evaluation module 112b may transmit or transfer the first request to a bot server, such as internal entity computing system 120 or internal entity computing system 125 for processing. In some examples, evaluating the first request to determine whether it is eligible to be handled by a bot may include determining a type of request or service associated with the request. In some examples, this data may be used to schedule a bot to address the first request. In some examples, the bots may be cognitive bots that leverage artificial intelligence technologies, such as optical character recognition, natural language processing, text analytics, machine learning, and the like, to execute one or more functions automatically. Accordingly, data received from the user (e.g., text data associated with a request, documentation accompanying the request, and the like) may be processed by the bot using the artificial intelligence technologies to determine an output for the requesting user.

If the first request is not eligible for bot processing, the request may be evaluated to determine a best fit resource to handle the first request. For instance, a computational module 112c may create (e.g., based on instructions from the polylithic cognitive optimizer) or include a plurality of computational instances (e.g., virtual machines) configured to evaluate each request to determine a best fit region, best fit site and/or best fit resource. In some examples, determining the best fit region, best fit site and/or best fit resource may include balancing load across multiple regions, sites, or the like, such as via a cloud load balancer. In some examples, the polylithic cognitive optimizer of the service evaluation module 112b may determine an appropriate number of computational instances to deploy in the computational module 112c based on, for instance, volume of requests received, volume of requests in each messaging queue, and the like. In some examples, the polylithic cognitive optimizer of the service evaluation module 112b may determine an optimal number of computational instances and may deploy that number of instances in the computational module 112c. In some arrangements, evaluation of the current number of instances may be performed on a predetermined schedule, as new requests are received, when a threshold number of requests are received, upon an indication of a failed instance, or the like.

The polylithic cognitive optimizer of the service evaluation module 112b may further receive status or operational data of the computational instances in the computational module 112c, such as via an IoT hub. The operational data received via the IoT hub may indicate one or more instances that is operating outside of an expected range or operational status. For instance, a status or other performance indicator of each instance may be compared to a threshold range of performance and, if below that range, the instance may be identified as operating below an expected range. That instance may then be removed and replace by a newly created instance based on instructions from the polylithic cognitive optimizer of the service evaluation module 112b. Accordingly, any processing functions performed by the deficient instance may be transferred to the new instance to maintain seamless processing (e.g., efficient transfer without a gap in processing).

The computational module 112c may perform one or more computational functions to determine a best resource (e.g., best site, best region, best entity user or associate) to handle the request. For instance, computational module 112c may implement a load balancer to identify a best available cloud region to address the request (e.g., underutilized clouds or clouds having low volume may be assigned more requests than others having higher volume). Additionally or alternatively, computational module 112c may calculate a score for each entity user or resource to determine a best available resource to handle a request. In some examples, the score may be based on various factors, such as a number of issues or errors in processing requests, an identification of ways to improve performance, an output of one or more computer adaptive tests, and the like.

In some examples, a cognitive rule engine 112d may store various rules for use by the computational module 112c in evaluating users or resources. For instance, the cognitive rule engine 112d may store, train and/or execute a predictive model to determine a score associated with improvements available in handling a matter. For instance, in-line audits (e.g., as a request is being processed by a resource, an audit may be occurring simultaneously or near simultaneously to quickly identify and correct any issues) may be performed during processing of one or more requests and a machine learning model may be used to identify a score associated with the ability of the user to improve accuracy, timeliness or the like, associated with processing similar requests. For instance, a model may be trained using historical data linking particular types of errors, frequency of errors, or the like, to a likelihood associated with improving performance. The model may then be executed on subsequent data to determine a score associated with how much the user can improve (e.g., a user with no errors and expected timeliness will have a score corresponding to no room for improvement while a user with many errors may have a higher score).

The cognitive rule engine 112d may also store one or more rules associated results of the inline audit that may identify how many errors occurred in addressing the resource. The cognitive rule engine 112d may further store rules associated with results of one or more computer adaptive tests completed by the user. For instance, users may be tested to determine proficiency in one or more areas. The scheduling, frequency, and/o results of the testing may be stored by the cognitive rules engine.

The computational module 112c may receive data from the cognitive rules engine and determine a final score for a particular user or resource. For instance, a score associated with a number of errors identified via an inline audit of processing, a score associated with an output of the predictive model, and/or one or more scores associated with the computer adaptive tests may be summed to determine a final score for the resource. In some examples, one or more weighting factors may be applied to each score in determining the final score. The final score may then be used to identify a best fit resource to handle the request. For instance, scores having a first range may be assigned to a first user or resource, scores having a second range may be assigned to a second user or resource, and the like.

Prior to assigning the request to the identified best fit resource, the computational module 112c may receive data (e.g., via an IoT hub) related to real-time activity of the resources in order to determine availability. For instance, cursor movement, activity logs, and the like, form the users may be received and used to determine availability of resources. If the identified best fit resource is available, the request may be assigned to that user for processing. If the identified best fit resource is unavailable, a second or other best fit resource may be identified and, if available, the request may be assigned.

In some examples, IoT hub activity data may be received prior to identifying the best fit resource and may be used, with the final score, to identify the resource or user to receive and process the request.

Cognitive convergence computing platform 110 may further have, store and/or include a database 112e. Database 112e may store data related to various cloud regions, various sites and/or various associates and/or resources.

FIGS. 2A-2F depict one example illustrative event sequence for executing cognitive convergence functions to identify a best fit resource in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
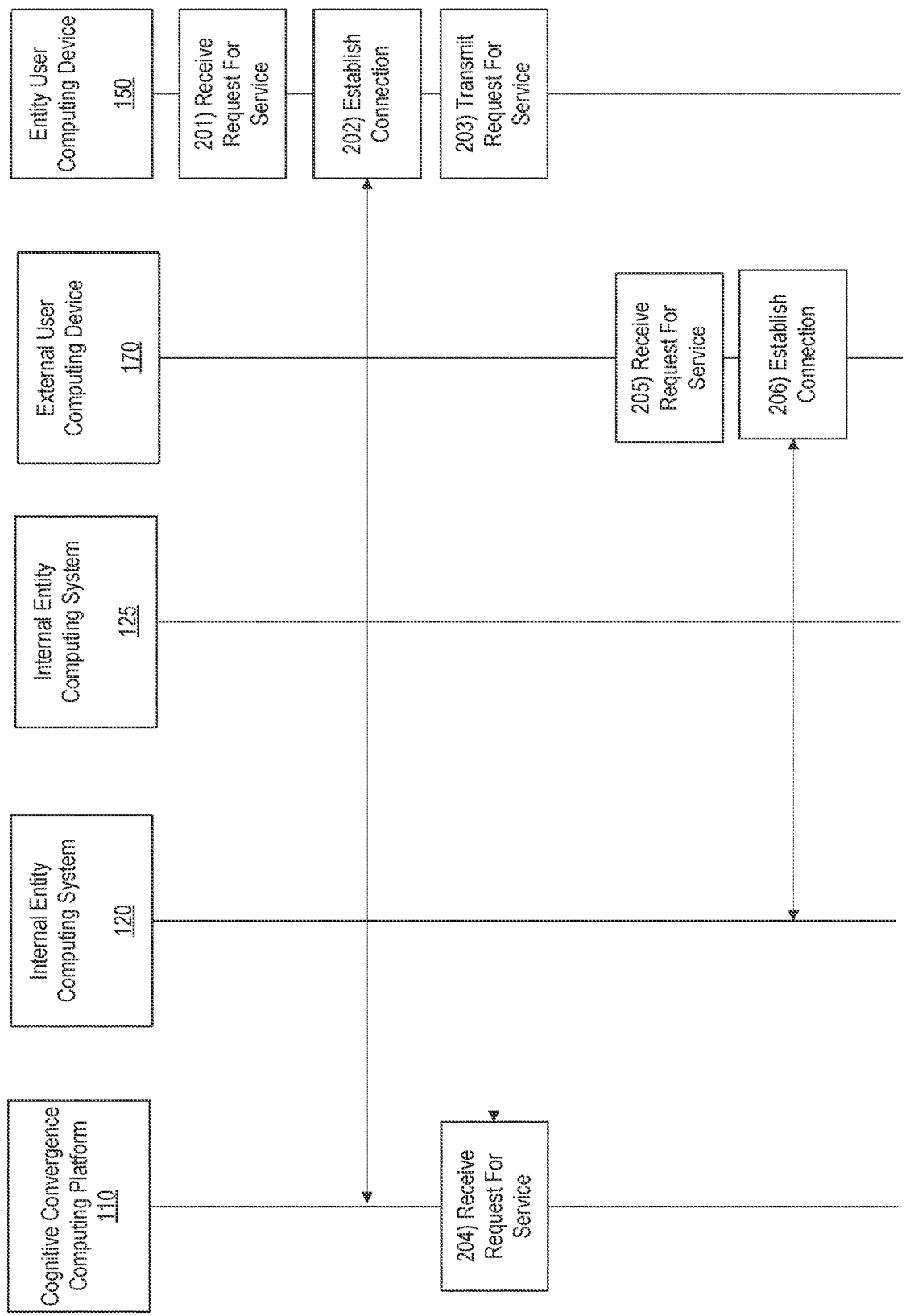

Referring to FIG. 2A, at step 201, an entity user computing device, such as entity user computing device 150, may receive a request for service. For instance, a user may call into a service call center and a call center associate handling the call or an automated system handling the call may receive a service request from a user. In another example, a user may make an in-person request via a retail location, customer service desk at a banking location, or the like. The entity user computing device 150 may be a computing device associated with an associate at the location and the request may be input into the entity user computing device 150 based on a request received from the user.

At step 202, a connection may be established between the entity user computing device 150 and cognitive convergence computing platform 110. For instance, a first wireless connection may be established between the entity user computing device 150 and cognitive convergence computing platform 110. Upon establishing the first wireless connection, a communication session may be initiated between cognitive convergence computing platform 110 and entity user computing device 150.

At step 203, the entity user computing device 150 may transmit the received request for service to the cognitive convergence computing platform 110. For instance, during the communication session initiated upon establishing the first wireless connection, the request for service may be transmitted to the cognitive convergence computing platform 110.

At step 204, the cognitive convergence computing platform 110 may receive the request for service.

At step 205, a request for service may be received via a different communication channel. For instance, an external user computing device 170, such as a user computing device, mobile device, or the like, may receive a request for service from a user via, for instance, a user interface associated with an online or mobile application executing on the external user computing device 170.

At step 206, a connection may be established between the external user computing device 170 and internal entity computing system 120. For instance, a second wireless connection may be established between the external user computing device 170 and internal entity computing system 120. Upon establishing the second wireless connection, a communication session may be initiated between internal entity computing system 120 and external user computing device 170.

Figure 2B:
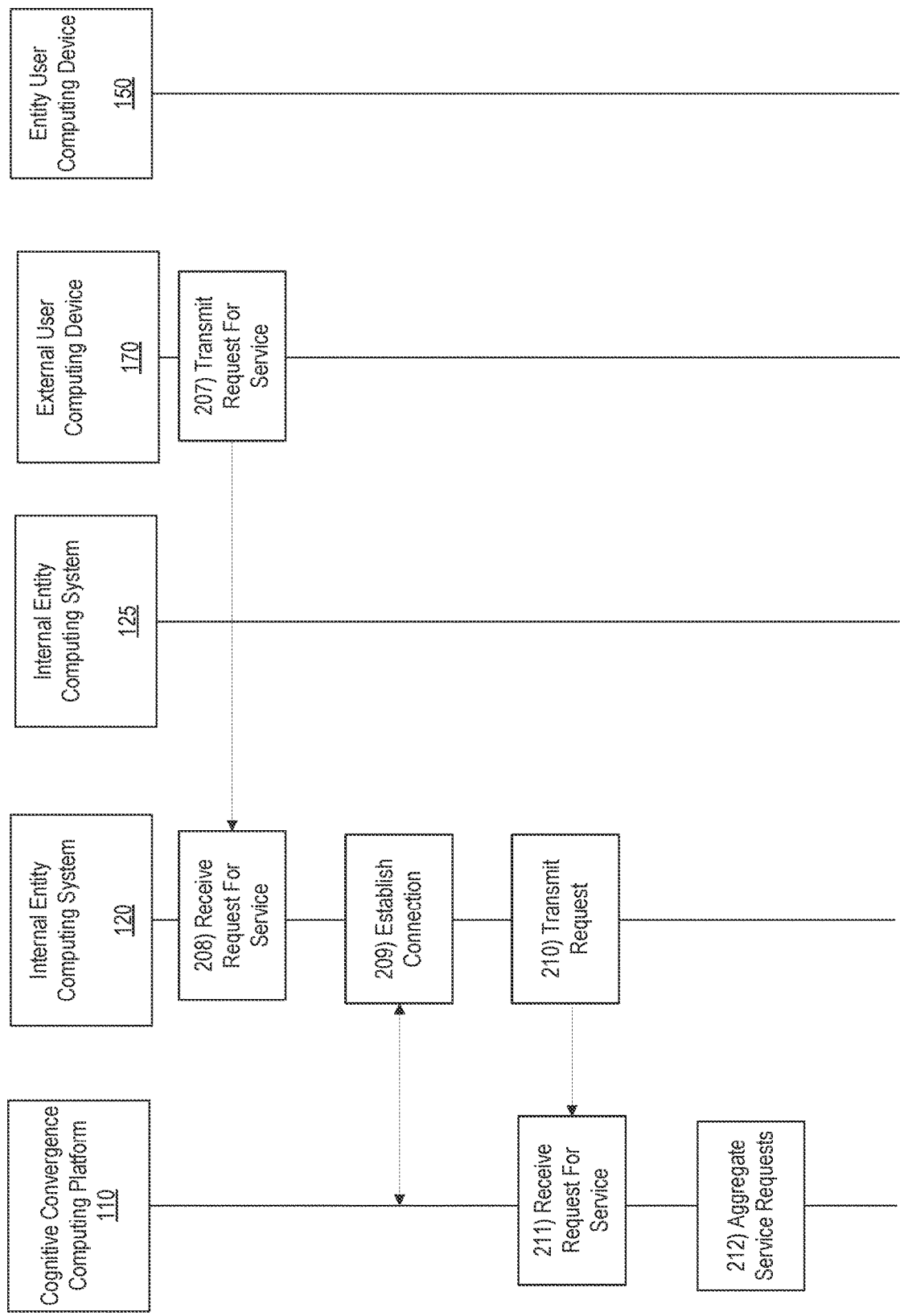

With reference to FIG. 2B, at step 207, the external user computing device 170 may transmit the received request for service to the internal entity computing system 120. For instance, internal entity computing system 120 may be or include one or more computing devices, systems, or the like, hosting or executing applications associated with a client-facing portal such as an online web banking application, a mobile application, or the like. In some examples, the request for service may be transmitted during the communication session initiated upon establishing the second wireless connection.

At step 208, the request for service may be received by the internal entity computing system 120.

At step 209, a connection may be established between the internal entity computing system 120 and the cognitive convergence computing platform 110. For instance, a third wireless connection may be established between the internal entity computing system 120 and the cognitive convergence computing platform 110. Upon establishing the third wireless connection, a communication session may be initiated between internal entity computing system 120 and cognitive convergence computing platform 110.

At step 210, the internal entity computing system 120 may transmit the request for service to the cognitive convergence computing platform 110. For instance, the request may be transmitted during the communication session initiated upon establishing the third wireless connection.

At step 211, the cognitive convergence computing platform 110 may receive the request for service.

While two requests for service are described as being received by the cognitive convergence computing platform 110, more or fewer requests may be received. Additionally or alternatively, in some examples, the requests may be received from multiple channels, or the same channel, simultaneously or near simultaneously.

At step 212, the cognitive convergence computing platform 110 may aggregate one or more received requests for service into one or more messaging queues. For instance, the request for service received at step 204 and the request for service received at step 211 (and/or any other requests for service) may be aggregated in one or more messaging queues. In some examples, the request for service may be aggregated in a messaging queue with other requests of a same type. Accordingly, different messaging queues for different types of requests may be generated.

With reference to FIG. 2C, at step 213, the cognitive convergence computing platform 110 may evaluate a first request in a first messaging queue to determine whether the request for service can be addressed by a bot. For instance, a polylithic cognitive optimizer may evaluate the request to determine whether it is eligible for bot processing. In some examples, the request may be evaluated to determine a type of request, response time, and the like, in order to determine whether it is eligible for bot processing.

At step 214, the cognitive convergence computing platform 110 may determine that the first request is eligible for bot processing. Responsive to the determination, at step 215, a connection may be established between the internal entity computing system 125, which may be a bot server, and the cognitive convergence computing platform 110. For instance, a fourth wireless connection may be established between the internal entity computing system 125 and the cognitive convergence computing platform 110. Upon establishing the fourth wireless connection, a communication session may be initiated between internal entity computing system 125 and cognitive convergence computing platform 110.

In some examples, an enterprise organization may include a plurality of internal entity computing systems and selection of a particular system including, for instance, a bot server, to receive the request may be based on a type of request or type of service associated with the request.

At step 216, the cognitive convergence computing platform 110 may transfer the first request to the internal entity computing system 125 for processing. In some examples, the first request may be transmitted during the communication session initiated upon establishing the fourth wireless connection.

At step 217, the internal entity computing system 125 may receive the first request transmitted by the cognitive convergence computing platform 110.

With reference to FIG. 2D, at step 218, the internal entity computing system 125 may process the request to generate an output. For instance, a bot associated with the internal entity computing system 125 may process the first request and generate an output.

At step 219, the generated output may be displayed by a display of the internal entity computing system 125. In some examples, displaying the output may include displaying an option to override the generated output (e.g., a user may override the output generated by the bot). In some examples, displaying the output may include transmitting the output to another computing device, such as entity user computing device 150, for display on a display of that device.

At step 220, cognitive convergence computing platform 110 may evaluate a second request in the first messaging queue (or another request in another messaging queue) to determine whether it can be addressed by a bot. For instance, a polylithic cognitive optimizer of the cognitive convergence computing platform 110 may evaluate the second request in the first messaging queue to determine whether it is eligible for bot processing. In some examples, the second request may be evaluated simultaneously or near simultaneously with the first request.

At step 221, the cognitive convergence computing platform 110 may determine that a bot cannot address the second request.

With reference to FIG. 2E, at step 222, a number of computational instances (e.g., virtual machines) may be determined or evaluated. For instance, based on real-time or near real-time data related to requests, volume or requests, or the like, the cognitive convergence computing platform 110 may determine a number of instances of virtual machines made available for use in identifying best fit resources. In some examples, an Internet of Things (IoT) hub may be used to evaluate instances, determine whether an instance has failed, deploy a replacement instance or additional instance, or the like. In some examples, step 222 may be performed on a periodic basis, upon detection of a failed instance, upon receiving a threshold number of requests in the messaging queue, or the like.

At step 223, real-time data from one or more resource devices may be received. For instance, cognitive convergence computing platform 110 may receive (e.g., via an IoT hub) real-time data associated with activity logs, cursor movement, and the like, of the resource users and associated devices. This data may be used to determine availability (e.g., in real-time) of an identified best fit resource or to aid in identifying a best available fit resource.

At step 224, a best fit resource may be determined by the cognitive convergence computing platform 110. For instance, the computational instances in the computational module may be executed to calculate a score for each resource. As discussed herein, the score may be based on various parameters, such as a point in time score indicating a number of errors a resource has made, a predictive model score indicating a likelihood of improvement, a score associated with one or more computer adaptive tests, and the like.

At step 225, based on the final score and identification of the best fit resource, the request being evaluated may be assigned or transferred to the identified resource (e.g., based on availability). For instance, the request and any associated documentation may be transmitted to the resource computing device (such as entity user computing device 155).

At step 226, a next request in the messaging queue (or another messaging queue) may be evaluated (e.g., for bot processing, for a best fit resource, and the like). The process may then continue until all requests have been processed.

Figure 2F:
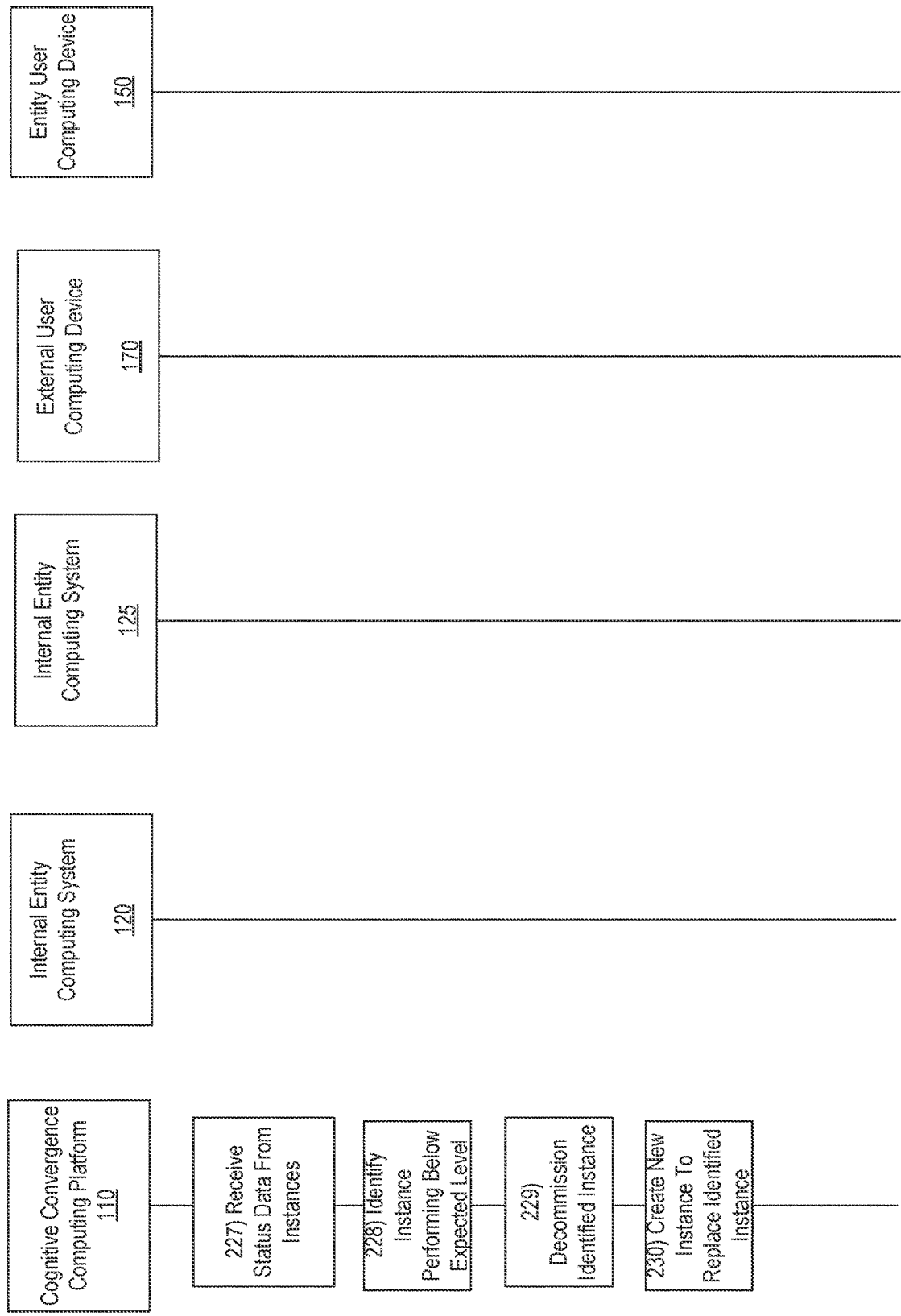

With reference to FIG. 2F, at step 227, the cognitive convergence computing platform 110 may receive data associated with an operational status or performance of the computational instances. In some examples, the data may be received in real-time or near real-time.

At step 228, one or more instances performing below an expected performance level may be identified. For instance, as discussed above, computational instances performed outside an expected threshold may be identified.

At step 229, the one or more identified instances may be decommissioned or removed from use. At step 230, one or more new instances may be created to replace the one or more decommissioned instances and may take over processing of any functions previously performed by the underperforming instances. Accordingly, a fail-safe mechanism is provided to ensure seamless, uninterrupted processing.

Figure 3:
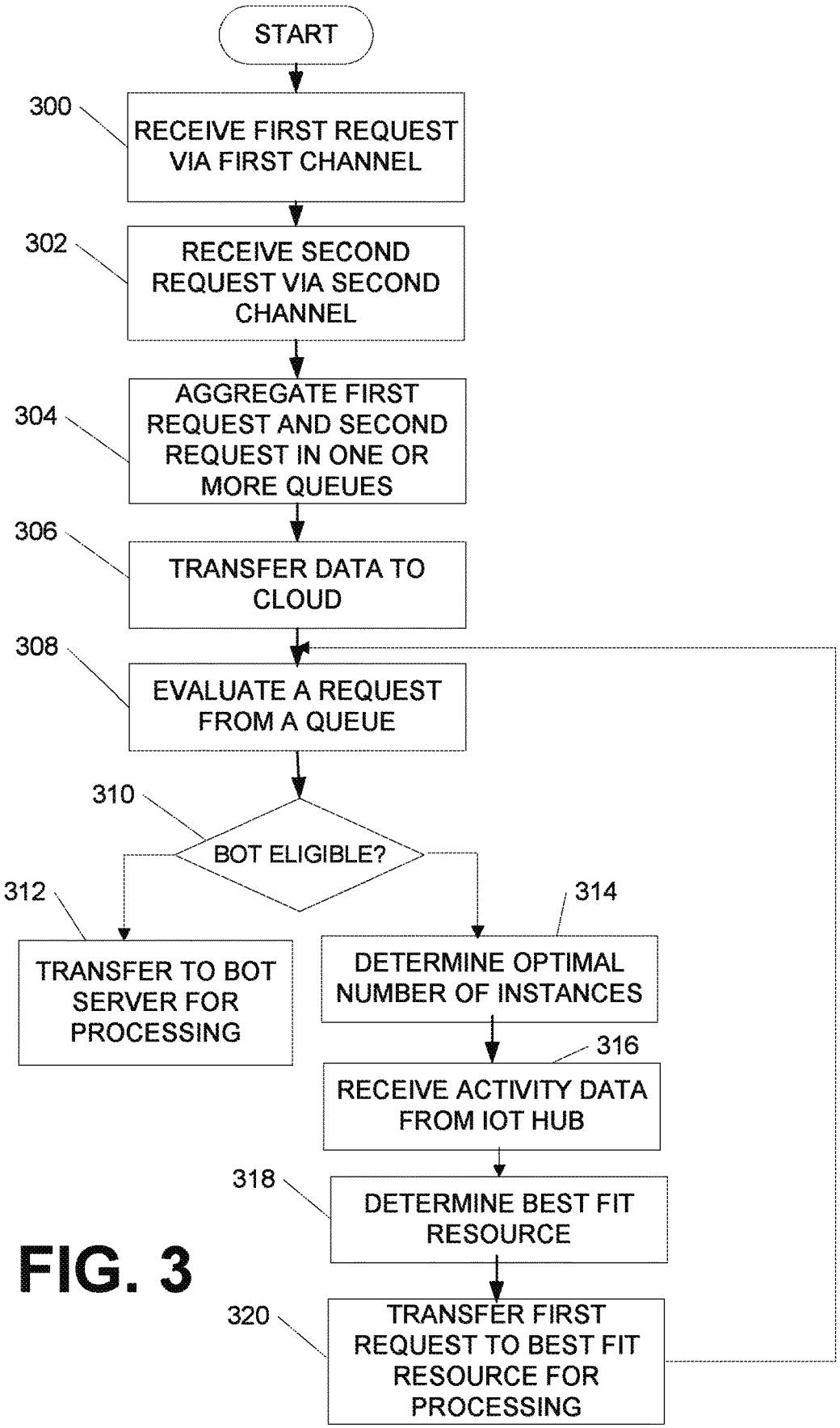
FIG. 3 illustrates an illustrative method for implementing cognitive convergence functions for resource optimization according to one or more aspects described herein.

FIG. 3 is a flow chart illustrating one example method of using a cognitive convergence engine for resource optimization in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a first request for service may be received via a first channel. For instance, a first request for service, action, or the like, may be received via a first channel of communication of a plurality of channels of communication. In some examples, the plurality of communication channels may include online requests (e.g., via a web application or mobile application), a phone call (e.g., to a service center), an in-person request (e.g., via an associate at a retail or banking location), or the like.

At step 302, a second request for service may be received via a second communication channel. For instance, a second request for service or action may be received via a second communication channel of the plurality of communication channels. In some examples, the second communication channel may be different from the first communication channel.

At step 304, the first and second requests may be aggregated into one or more messaging queues. For instance, if the first request is a first type (e.g., loan application) and the second request is the first type (e.g., loan application), both requests may be aggregated (e.g., with other requests of that type) in a messaging queue for that type of request. In another example, if the second request is a second type of request (e.g., credit card application) different from the first type of the first request (e.g., loan application) each request may be aggregated in different messaging queues for the respective type of request (e.g., with other received requests of that type).

At step 306, in some examples, the aggregated data may be transferred to a cloud environment for further processing. For instance, the one or more messaging queues including the aggregated data may be transferred to the cloud environment for evaluation of resources to address requests, determination of best fit resource, determination of whether a message is eligible for bot processing, and the like.

At step 308, a first request from a first messaging queue may be evaluated. In some examples, evaluating the first request may be performed by a polylithic cognitive optimizer of a computing platform. For instance, at step 310, a determination may be made (e.g., by the polylithic cognitive optimizer) as to whether the first request from the first messaging queue is eligible for bot processing. If so, at step 312, the first request from the first messaging queue may be transferred to a bot server for processing.

If, at step 310, the first request from the first messaging queue is not eligible for bot processing, it may be transferred for computation of a best fit resource. At step 314, an optimal number of computational instances may be determined. For instance, an optimal number of computational instances to calculate scores for available resources (e.g., based on volume of requests—each request needing a resource assignment) may be determined, such as by a polylithic cognitive optimizer of the computing platform, and created. In some examples, step 314 may be performed on a periodic or scheduled basis. Additionally or alternatively, the number of computational instances may be evaluated upon receiving a request, upon receiving a threshold number or volume of requests, or the like.

At step 316, real-time activity data from the resource devices may be received. For instance, cursor movement data, activity log data, and the like, for the resources may be received and evaluated to determine availability of resources (e.g., real-time cursor movement indicates the resource is busy while no cursor movement may indicate the resource is available).

At step 318, the best fit resource to handle the first request from the first messaging queue may be identified. For instance, as discussed herein, the computational instances may determine a score associated with each resource based on various parameters, such as number of errors in processing, results of computer adaptive tests, predictive model outputs, and the like. This final score, as well as availability data, may be used to identify a best fit resource to assign the first request from the first messaging queue.

At step 320, the first request from the first messaging queue may be assigned to the identified best fit resource and transferred to the computing device of the best fit resource. In some examples, transferring the first request from the first messaging queue to the computing device of the best fit resource may include transmitting assignment data associated with the first request and identified best fit resource for later use, to generate one or more insights or knowledge discovery, or the like. For instance, database 112e of the cognitive convergence computing platform 110 may receive data associated with the first request, the assigned best fit resource, an outcome of processing the request, and the like, and that data may be used to generate one or more insights, reports, or the like, into best fit resource optimization, performance of resources, and the like.

The process may then return to step 306 to evaluate a next request in the first messaging queue or a next request in another messaging queue.

Accordingly, the arrangements described herein may provide identification of a best fit resource to handle a request for service or action. The arrangements described herein enable identification of items that can be automatically processed and may not require a human resource to handle, thereby efficiently addressing those issues. Also, the arrangement discussed herein aid in identifying the best resource to efficiently address a request at a high level of accuracy in order to ensure successful processing.

Figure 4:
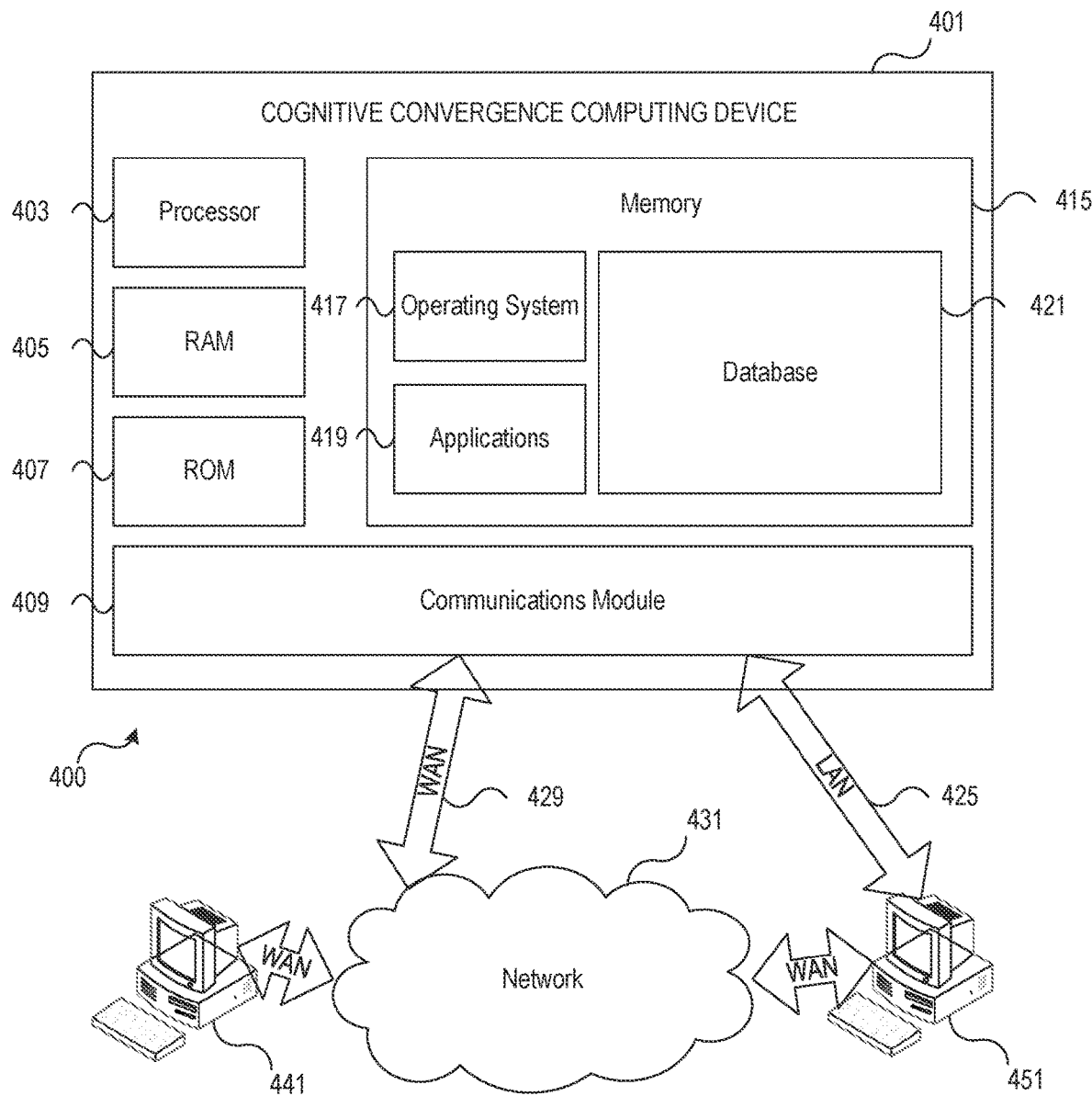
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include cognitive convergence computing device 401 having processor 403 for controlling overall operation of cognitive convergence computing device 401 and its associated components, including Random Access Memory (RAM) 405, Read-Only Memory (ROM) 407, communications module 409, and memory 415. Cognitive convergence computing device 401 may include a variety of computer readable media. Computer readable media may be any available media that may be accessed by cognitive convergence computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by cognitive convergence computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cognitive convergence computing device 401. Such a processor may execute computer-executable instructions stored on a computer-readable medium.

Software may be stored within memory 415 and/or storage to provide instructions to processor 403 for enabling cognitive convergence computing device 401 to perform various functions as discussed herein. For example, memory 415 may store software used by cognitive convergence computing device 401, such as operating system 417, application programs 419, and associated database 421. Also, some or all of the computer executable instructions for cognitive convergence computing device 401 may be embodied in hardware or firmware. Although not shown, RAM 405 may include one or more applications representing the application data stored in RAM 405 while cognitive convergence computing device 401 is on and corresponding software applications (e.g., software tasks) are running on cognitive convergence computing device 401.

Communications module 409 may include a microphone, keypad, touch screen, and/or stylus through which a user of cognitive convergence computing device 401 may provide input, and may also include one or more of a speaker for providing audio output and a video display device for providing textual, audiovisual and/or graphical output. Computing system environment 400 may also include optical scanners (not shown).

Cognitive convergence computing device 501 may operate in a networked environment supporting connections to one or more remote computing devices, such as computing devices 441 and 451. Computing devices 441 and 451 may be personal computing devices or servers that include any or all of the elements described above relative to cognitive convergence computing device 501.

The network connections depicted in FIG. 4 may include Local Area Network (LAN) 425 and Wide Area Network (WAN) 429, as well as other networks. When used in a LAN networking environment, cognitive convergence computing device 401 may be connected to LAN 425 through a network interface or adapter in communications module 409. When used in a WAN networking environment, cognitive convergence computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive a first request for service, the first request for service having a first type and being received from a first location;
      receive a second request for service, the second request for service having a second type different from the first type and being received from a second location;
      aggregate, at a third location, the first request and the second request in a first messaging queue and a second messaging queue, respectively, based on the first type and the second type, wherein aggregating the first request in the first messaging queue and the second request in the second messaging queue includes masking a portion of data in each of the first request and second request;
      identify, based on a volume of requests in the one or more messaging queues, a number of virtual machines to evaluate resources for handling the volume of requests, wherein the resources include one of: a geographic region or a worksite and wherein each resource includes a plurality of resource devices;
      deploy the number of virtual machines identified;
      evaluate, by the deployed number of virtual machines, the resources to identify available resources to process the volume of requests;
      identify, by the virtual machines and based on the evaluating the resources, a first resource of the available resources to process the first request from the first messaging queue, wherein evaluating the resources to identify the first resource of the available resources to process the first request includes:
         execute an in-line audit on a request currently being processed by each resource to determine a score associated with a number of errors in processing;
         generate, based executing a machine learning model on data from the in-line audit, a score associated with potential improvement;
         execute one or more computer adaptive tests to determine a score associated with proficiency of a user at each resource;
         determine, based on the score associated with the number of errors in processing, score associated with potential improvement and score associated with proficiency of a user at each resource, an overall score for each resource; and
         identify, based on the overall score for each resource, the first resource to process the first request from the first messaging queue;
      receive, in real-time and from a first plurality of resource devices associated with the first resource, resource device activity data indicating availability of the first plurality of resource devices including a first resource device of the first resource;
      responsive to determining, based on the resource device activity data, that the first resource is available, transfer, to the first resource device of the first resource, the first request from the first messaging queue; and
      responsive to determining, based on the resource device activity data, that the first resource is unavailable, identify, by the virtual machines and based on the evaluating the resources, a second resource to process the first request from the first messaging queue.

2. The computing platform of claim 1, wherein the first request is received via a first communication channel and the second request is received via a second communication channel different from the first communication channel.

3. The computing platform of claim 1, wherein the first request for service includes a request for one of: a loan, opening an account, and initiating a claim.

4. The computing platform of claim 1, further including instructions that, when executed, cause the computing platform to:
   receive, in real-time, data related to operational status of each virtual machine of the virtual machines;
   identify, based on analyzing the received data related to operational status of each virtual machine, at least one virtual machine performing below an expected operational status;
   create a replacement virtual machine;
   transfer processing being performed by the at least one virtual machine to the replacement virtual machine; and
   decommission the at least one virtual machine.

5. The computing platform of claim 4, wherein the data related to the operational status of the virtual machines is received via an Internet of Things (IoT) hub.

6. The computing platform of claim 1, wherein the resource device activity data includes cursor movement data and activity log data from the plurality of resource devices.

7. A method, comprising:
   receiving, by a computing platform, the computing platform having at least one processor and memory, a first request for service, the first request for service having a first type and being received from a first location;
   receiving, by the at least one processor, a second request for service, the second request for service having a second type different from the first type and being received from a second location;

aggregating, by the at least one processor and at a third location, the first request and the second request in a first messaging queue and a second messaging queue, respectively, based on the first type and the second type, wherein aggregating the first request in the first messaging queue and the second request in the second messaging queue includes masking a portion of data in each of the first request and second request;

identifying, by the at least one processor and based on a volume of requests in the one or more messaging queues, a number of virtual machines to evaluate resources for handling the volume of requests, wherein the resources include one of: a geographic region or a worksite and wherein each resource includes a plurality of resource devices;

deploying, by the at least one processor, the number of virtual machines identified;

evaluating, by the deployed number of virtual machines, the resources to identify available resources to process the volume of requests;

identifying, by the at least one processor, by the virtual machines, and based on the evaluating the resources, a first resource of the available resources to process the first request from the first messaging queue, wherein evaluating the resources to identify the first resource of the available resources to process the first request includes:

executing an in-line audit on a request currently being processed by each resource to determine a score associated with a number of errors in processing;

generating, based executing a machine learning model on data from the in-line audit, a score associated with potential improvement;

executing one or more computer adaptive tests to determine a score associated with proficiency of a user at each resource;

determining, based on the score associated with the number of errors in processing, score associated with potential improvement and score associated with proficiency of a user at each resource, an overall score for each resource; and identifying, based on the overall score for each resource, the first resource to process the first request from the first messaging queue;

receiving, by the at least one processor and in real-time and from a first plurality of resource devices associated with the first resource, resource device activity data indicating availability of the first plurality of resource devices including a first resource device of the first resource;

responsive to determining, based on the resource device activity data, that the first resource is available, transferring, by the at least one processor and to the first resource device of the first resource, the first request from the first messaging queue; and responsive to determining, based on the resource device activity data, that the first resource is unavailable, identifying, by the at least one processor, by the virtual machines and based on the evaluating the resources, a second resource to process the first request from the first messaging queue.

8. The method of claim 7, wherein the first request is received via a first communication channel and the second request is received via a second communication channel different from the first communication channel.

9. The method of claim 7, further including:

receiving, by the at least one processor and in real-time, data related to operational status of each virtual machine of the virtual machines;

identifying, by the at least one processor and based on analyzing the received data related to operational status of each virtual machine, at least one virtual machine performing below an expected operational status;

creating, by the at least one processor, a replacement virtual machine;

transferring, by the at least one processor, processing being performed by the at least one virtual machine to the replacement virtual machine; and decommissioning, by the at least one processor, the at least one virtual machine.

10. The method of claim 9, wherein the data related to the operational status of the virtual machines is received via an Internet of Things (IoT) hub.

11. The method of claim 7, wherein the resource device activity data includes cursor movement data and activity log data from the plurality of resource devices.

12. One or more non-transitory computer-readable media storing instructions that, when executed by a computing platform comprising at least one processor, memory, and a communication interface, cause the computing platform to:

receive a first request for service, the first request for service having a first type and being received from a first location;

receive a second request for service, the second request for service having a second type different from the first type and being received from a second location;

aggregate, at a third location, the first request and the second request in a first messaging queue and a second messaging queue, respectively, based on the first type and the second type, wherein aggregating the first request in the first messaging queue and the second request in the second messaging queue includes masking a portion of data in each of the first request and second request;

identify, based on a volume of requests in the one or more messaging queues, a number of virtual machines to evaluate resources for handling the volume of requests, wherein the resources include one of: a geographic region or a worksite and wherein each resource includes a plurality of resource devices;

deploy the number of virtual machines identified;

evaluate, by the deployed number of virtual machines, the resources to identify available resources to process the volume of requests;

identify, by the virtual machines and based on the evaluating the resources, a first resource of the available resources to process the first request from the first messaging queue, wherein evaluating the resources to identify the first resource of the available resources to process the first request includes:

execute an in-line audit on a request currently being processed by each resource to determine a score associated with a number of errors in processing;

generate, based executing a machine learning model on data from the in-line audit, a score associated with potential improvement;

execute one or more computer adaptive tests to determine a score associated with proficiency of a user at each resource;

determine, based on the score associated with the number of errors in processing, score associated with potential improvement and score associated with proficiency of a user at each resource, an overall score for each resource; and identify, based on the overall score for each resource, the first resource to process the first request from the first messaging queue;

receive, in real-time and from a first plurality of resource devices associated with the first resource, resource device activity data indicating availability of the first plurality of resource devices including a first resource device of the first resource;

responsive to determining, based on the resource device activity data, that the first resource is available, transfer, to the first resource device of the first resource, the first request from the first messaging queue; and responsive to determining, based on the resource device activity data, that the first resource is unavailable, identify, by the virtual machines and based on the evaluating the resources, a second resource to process the first request from the first messaging queue.

13. The one or more non-transitory computer-readable media of claim 12, wherein the first request is received via a first communication channel and the second request is received via a second communication channel different from the first communication channel.

14. The one or more non-transitory computer-readable media of claim 12, further including instructions that, when executed, cause the computing platform to:

receive, in real-time, data related to operational status of each virtual machine of the virtual machines;

identify, based on analyzing the received data related to operational status of each virtual machine, at least one virtual machine performing below an expected operational status;

create a replacement virtual machine;

transfer processing being performed by the at least one virtual machine to the replacement virtual machine; and decommission the at least one virtual machine.

15. The one or more non-transitory computer-readable media of claim 14, wherein the data related to the operational status of the virtual machines is received via an Internet of Things (IoT) hub.

16. The one or more non-transitory computer-readable media of claim 12, wherein the resource device activity data includes cursor movement data and activity log data from the plurality of resource devices.

17. The one or more non-transitory computer-readable media of claim 12, further including instructions that, when executed, cause the computing platform to:

receive data related to processing the first request from the first messaging queue; and generate, based on the received data related to processing the first request from the first messaging queue, an insight related to one of: identification of the first resource or performance of a resource used to process the first request from the first messaging queue.

* * * * *